United States Patent
Hu et al.

(10) Patent No.: US 11,907,659 B2
(45) Date of Patent: Feb. 20, 2024

(54) ITEM RECALL METHOD AND SYSTEM, ELECTRONIC DEVICE AND READABLE STORAGE MEDIUM

(71) Applicants: Beijing Jingdong Shangke Information Technology Co., Ltd., Beijing (CN); Beijing Jingdong Century Trading Co., Ltd., Beijing (CN)

(72) Inventors: Yitong Hu, Beijing (CN); Yun Gao, Beijing (CN); Na Wang, Beijing (CN); Lili Zuo, Beijing (CN); Yahong Zhang, Beijing (CN)

(73) Assignees: Beijing JIngdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 235 days.

(21) Appl. No.: 17/296,159

(22) PCT Filed: Jan. 2, 2020

(86) PCT No.: PCT/CN2020/070014
§ 371 (c)(1),
(2) Date: May 21, 2021

(87) PCT Pub. No.: WO2020/168839
PCT Pub. Date: Aug. 27, 2020

(65) Prior Publication Data
US 2022/0019739 A1     Jan. 20, 2022

(30) Foreign Application Priority Data
Feb. 21, 2019  (CN) .......................... 201910130377.1

(51) Int. Cl.
*G06F 40/289* (2020.01)
*G06F 16/33* (2019.01)
(Continued)

(52) U.S. Cl.
CPC ........ *G06F 40/289* (2020.01); *G06F 11/3438* (2013.01); *G06F 16/3326* (2019.01); *G06F 16/3347* (2019.01); *G06F 18/22* (2023.01)

(58) Field of Classification Search
CPC ............... G06F 40/289; G06F 11/3438; G06F 16/3326; G06F 16/3347; G06F 18/22;
(Continued)

(56) References Cited

U.S. PATENT DOCUMENTS 6,098,033 A  *  8/2000  Richardson ............. G06F 40/30
                                                                704/9
7,343,280 B2 *  3/2008  Wu ....................... G06F 40/216
                                                               704/10
(Continued)

FOREIGN PATENT DOCUMENTS

| CN | 104636334 A | 5/2015 |
| CN | 106874492 A | 6/2017 |
| CN | 108664637 A | 10/2018 |

OTHER PUBLICATIONS

PCT International Search Report dated Mar. 26, 2020 for PCT/CN2020/070014.

*Primary Examiner* — Abdelali Serrou
(74) *Attorney, Agent, or Firm* — McCarter & English, LLP

(57) ABSTRACT

An item recall method includes: behavior data is acquired, where the behavior data includes items and item information of each item; target behavior data containing a retrieval category word is extracted from the behavior data; retrieval words of each item and a retrieval frequency of each retrieval word are acquired in a reverse correlation manner;
(Continued)

word segmentation is performed on the item information to obtain multiple item segmented words; a similarity between all retrieval words and the multiple item segmented words is calculated; whether the similarity is greater than a first preset threshold or not is determined, and if yes, then a retrieval word is extracted as an expansion word of the retrieval category word; and item recall is performed according to the retrieval category word and the expansion word.

7 Claims, 6 Drawing Sheets

(51) Int. Cl.
- *G06F 16/332* (2019.01)
- *G06F 11/34* (2006.01)
- *G06F 18/22* (2023.01)

(58) Field of Classification Search
CPC .... G06F 16/313; G06F 40/253; G06F 40/268; G06F 40/284; G06F 16/3344; G06F 16/9535; G06F 16/337; G06F 16/2433; G06F 16/24534; G06F 16/24558; G06F 16/3338; G06F 16/3346; G06F 16/35; G06F 16/951; G06F 18/2415; G06F 18/24323; G06F 40/216

See application file for complete search history.

(56) References Cited

U.S. PATENT DOCUMENTS

| | | | |
|---|---|---|---|
| 8,655,648 B2* | 2/2014 | Kulkarni | G06F 16/9562 707/706 |
| 10,747,792 B2* | 8/2020 | Ouyang | G06F 16/3322 |
| 2008/0162118 A1 | 7/2008 | Itoh et al. | |
| 2010/0179801 A1* | 7/2010 | Huynh | G06F 40/56 704/1 |
| 2014/0108200 A1* | 4/2014 | Ning | G06F 16/332 705/26.62 |
| 2016/0070803 A1* | 3/2016 | Nuckolls | G06F 16/3347 707/730 |
| 2020/0134038 A1* | 4/2020 | Chandra Sekar Rao | G06N 3/08 |

* cited by examiner

ITEM RECALL METHOD AND SYSTEM, ELECTRONIC DEVICE AND READABLE STORAGE MEDIUM

CROSS-REFERENCE TO RELATED APPLICATION(S)

This is a national stage application filed under 35 U.S.C. 371 based on International Patent Application No. PCT/CN2020/070014, filed on Jan. 2, 2020, which claims priority to Chinese Patent Application No. 201910130377.1 filed on Feb. 21, 2019, disclosure of which is incorporated herein by reference in its entirety.

TECHNICAL FIELD

The present disclosure belongs to the field of big data processing, and in particular relates to an item recall method, system, an electronic device and a readable storage medium.

BACKGROUND

In the field of e-commerce, similar scenes in which items need to be recalled based on item categories often occur, for example, similar scenes in which a batch of items satisfying requirements are recalled based on categories (such as dresses). In order to have a larger play space for a subsequent screening or sorting algorithm, there is a need to recall as many items as possible without loss of accuracy.

In the related art, a text matching related method is used, but for a same item, a description difference may exist, and the same item does not necessarily contain a category word, so that the item cannot be recalled.

SUMMARY

The present disclosure solves a technical problem of a poor item recall effect caused by a description difference in the related art, and to provide an item recall method and system, an electronic device and a readable storage medium.

The present disclosure solves the above technical problems through following technical solutions.

Provided is an item recall method. The item recall method includes steps below.

Behavior data of a user is acquired, where the behavior data includes items which are clicked and/or purchased and item information of each item.

A retrieval category word is inputted.

Target behavior data containing the retrieval category word is extracted from the behavior data.

Retrieval words of each item in the target behavior data and a retrieval frequency of each retrieval word in the target behavior data are acquired in a reverse correlation manner.

Word segmentation is performed on the item information in the target behavior data to obtain multiple item segmented words. a similarity between all retrieval words and the multiple item segmented words is calculated; whether the similarity being greater than a first preset threshold or not is determined, and if yes, then a retrieval word with a retrieval frequency greater than a preset frequency is extracted from the all retrieval words as an expansion word of the retrieval category word; and item recall is performed according to the retrieval category word and the expansion word.

Optionally, the step in which the retrieval words of the each item in the target behavior data and the retrieval frequency of the each retrieval word in the target behavior data are acquired in the reverse correlation manner includes: a relation list is generated according to the behavior data, where the relation list is used for representing a corresponding relation between the retrieval words and the items which are clicked and/or purchased; and the retrieval words of the each item in the target behavior data and the retrieval frequency of the each retrieval word in the target behavior data are acquired based on the relation list.

Optionally, the step in which the similarity between the all retrieval words and the multiple item segmented words is calculated includes: a de-duplication is performed on the all retrieval words to generate a retrieval word set; the de-duplication is performed on the multiple item segmented words to generate an item segmented word set; and a similarity between the retrieval word set and the item segmented word set is calculated based on a Jaccard algorithm (which is an algorithm used for comparing similarities and differences between sample sets).

Optionally, before the item recall is performed according to the retrieval category word and the expansion word, the item recall method further includes: a corpus is constructed, where the corpus includes an item recommendation article and item basic information; the corpus is trained based on word2vec (which is a model for generating a word vector) to obtain a word vector library, where the word vector library stores multiple item feature words and a feature vector corresponding to each item feature word; a similarity between the retrieval category word and the each item feature word is calculated based on a similarity algorithm; and an item feature word whose similarity with the retrieval category word is greater than a second preset threshold is extracted to be added into the expansion word.

Optionally, before the item recall is performed according to the retrieval category word and the expansion word, the item recall method further includes: an item category list is preset, where the item category list includes multiple item categories and attributes of all items under each item category; and whether the expansion word being contained in the item category list is determined, and if yes, then the expansion word contained in the category list is filtered out. The step in which the item recall is performed according to the retrieval category word and the expansion word specifically includes: the item recall is performed according to a filtered expansion word and the retrieval category word.

Provided is an electronic device. The electronic device includes a memory, a processor, and a computer program stored on the memory and executable on the processor. The processor, when executing the computer program, implements the item recall method described above.

Provided is a readable storage medium. A computer program is stored on the readable storage medium. The program, when executed by a processor, implements steps of the item recall method described above.

Provided is an item recall system. The item recall system includes a behavior data acquisition module, an input module, a data extraction module, a retrieval word acquisition module, a word segmentation module, a first calculation module, a first determination module, an expansion word generation unit and a recall module.

The behavior data acquisition module is configured to acquire behavior data of a user, where the behavior data includes items which are clicked and/or purchased and item information of each item.

The input module is configured to input a retrieval category word.

The data extraction module is configured to extract target behavior data containing the retrieval category word from the behavior data.

The retrieval word acquisition module is configured to acquire retrieval words of each item in the target behavior data and a retrieval frequency of each retrieval word in the target behavior data in a reverse correlation manner.

The word segmentation module is configured to perform word segmentation on the item information in the target behavior data to obtain multiple item segmented words.

The first calculation module is configured to calculate a similarity between all retrieval words and the multiple segmented words.

The first determination module is configured to determine whether the similarity is greater than a first preset threshold or not, and if yes, then call the expansion word generation unit.

The expansion word generation unit is configured to extract, from the all retrieval words, a retrieval word with a retrieval frequency greater than a preset frequency as an expansion word of the retrieval category word.

The recall module is configured to perform item recall according to the retrieval category word and the expansion word.

Optionally, the retrieval word acquisition module is configured to: generate a relation list according to the behavior data, where the relation list is used for representing a corresponding relation between the retrieval words and the items which are clicked and/or purchased, and acquire, based on the relation list, the retrieval words of the each item in the target behavior data and the retrieval frequency of the each retrieval word in the target behavior data.

Optionally, the first calculation module includes a collection generation unit and a calculation unit.

The collection generation unit is configured to perform a de-duplication on the all retrieval words to generate a retrieval word set, and is further configured to perform the de-duplication on the multiple item segmented words to generate an item segmented word set.

The calculation unit is configured to calculate, based on a Jaccard algorithm, a similarity between the retrieval word set and the item segmented word set.

Optionally, the item recall system further includes a corpus construction module, a word vector library generation unit, and a second calculation module.

The corpus construction module is configured to construct a corpus, where the corpus includes an item recommendation article and item basic information.

The word vector library generation unit is configured to train, based on word2vec, the corpus to obtain a word vector library, where the word vector library stores multiple item feature words and a feature vector corresponding to each item feature word.

The second calculation module is configured to calculate, based on a similarity algorithm, a similarity between the retrieval category word and the each item feature word.

The expansion word generation unit is further configured to extract an item feature word whose similarity with the retrieval category word is greater than a second preset threshold, and add this item feature word into the expansion word.

Optionally, the item recall system further includes a second determination module, a filtering module and an item category list. The item category list includes multiple item categories and attributes of all items under each item category.

The second determination module is configured to determine whether the expansion word is contained in the item category list, and if yes, then call the filtering module.

The filtering module is configured to filter out the expansion word contained in the category list.

The recall module is configured to perform the item recall according to a filtered expansion word and the retrieval category word.

DETAILED DESCRIPTION

The present disclosure is further illustrated by way of embodiments below.

Embodiment 1

Figure 1:
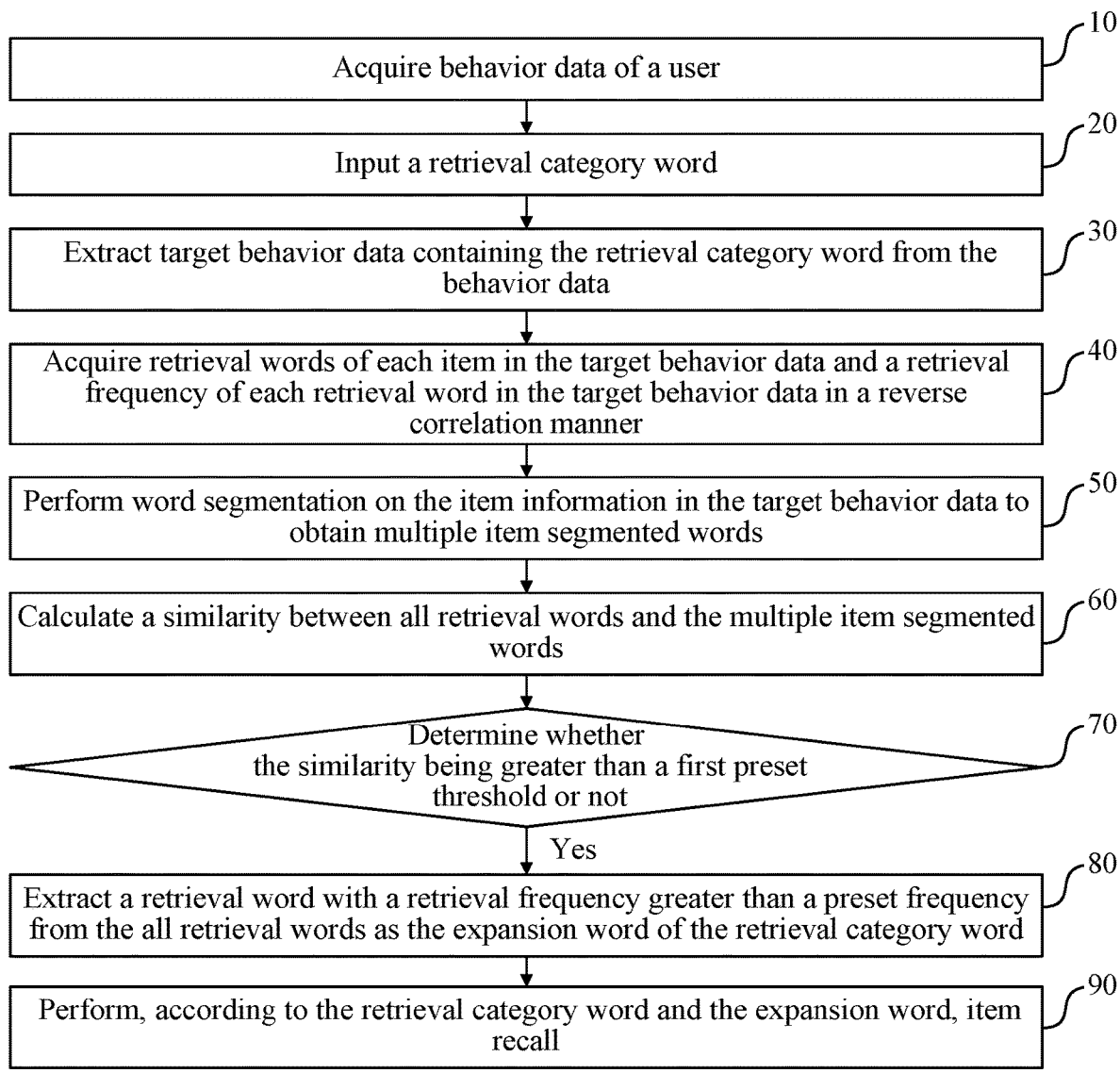
FIG. 1 is a flowchart of an item recall method according to an embodiment 1 of the present disclosure.

Provided is an item recall method, as shown in FIG. 1, the item recall method includes described below.

In step 10, behavior data of a user is acquired, where the behavior data includes items which are clicked and/or purchased and item information of each item.

In step 20, a retrieval category word is inputted.

In step 30, target behavior data containing the retrieval category word is extracted from the behavior data.

In step 40, retrieval words of each item in the target behavior data and a retrieval frequency of each retrieval word in the target behavior data are acquired in a reverse correlation manner.

In step 50, word segmentation is performed on item information in the target behavior data to obtain multiple item segmented words.

In step 60, a similarity between all retrieval words and the multiple item segmented words is calculated.

In step 70, whether the similarity being greater than a first preset threshold or not is determined, and if yes, then a step 80 is performed; if not, then it is indicated that the retrieval word cannot be used as an expansion word of the retrieval category word.

In step 80, a retrieval word with a retrieval frequency greater than a preset frequency is extracted from the all retrieval words as the expansion word of the retrieval category word.

In step 90, item recall is performed according to the retrieval category word and the expansion word.

The step 40 includes: a relation list is generated according to the behavior data, where the relation list is used for representing a corresponding relation between the retrieval words and the items which are clicked and/or purchased; and the retrieval words of the each item in the target behavior data and the retrieval frequency of the each retrieval word in the target behavior data are acquired based on the relation list.

Figure 2:
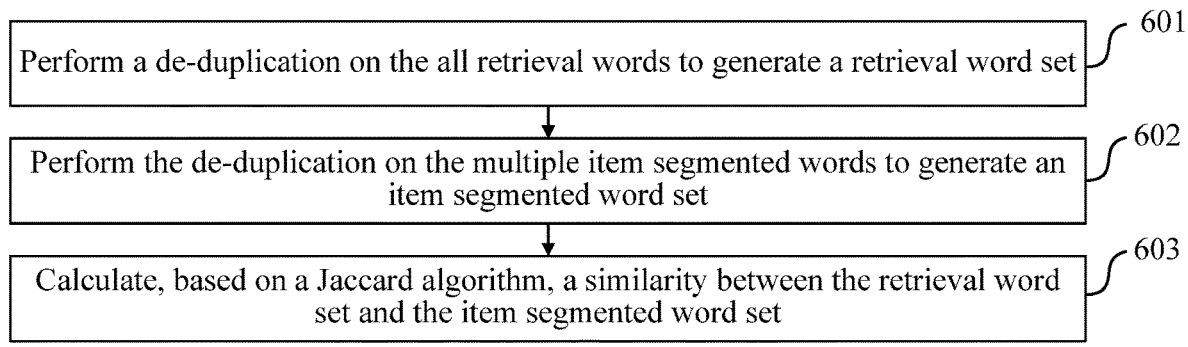
FIG. 2 is a flowchart of a step 60 in the item recall method according to an embodiment 1 of the present disclosure.

Referring to FIG. 2, the step 60 specifically includes described below.

In step 601, a de-duplication is performed on the all retrieval words to generate a retrieval word set.

In step 602, the de-duplication is performed on the multiple item segmented words to generate an item segmented word set.

In step 603, a similarity between the retrieval word set and the item segmented word set is calculated based on a Jaccard algorithm.

In this embodiment, when the category word is used for the item recall, an expansion word of an item category word is extracted and obtained by using the acquired behavior data, so that the recall accuracy is ensured, and meanwhile the coverage rate of recalled items is improved.

Embodiment 2

Figure 3:
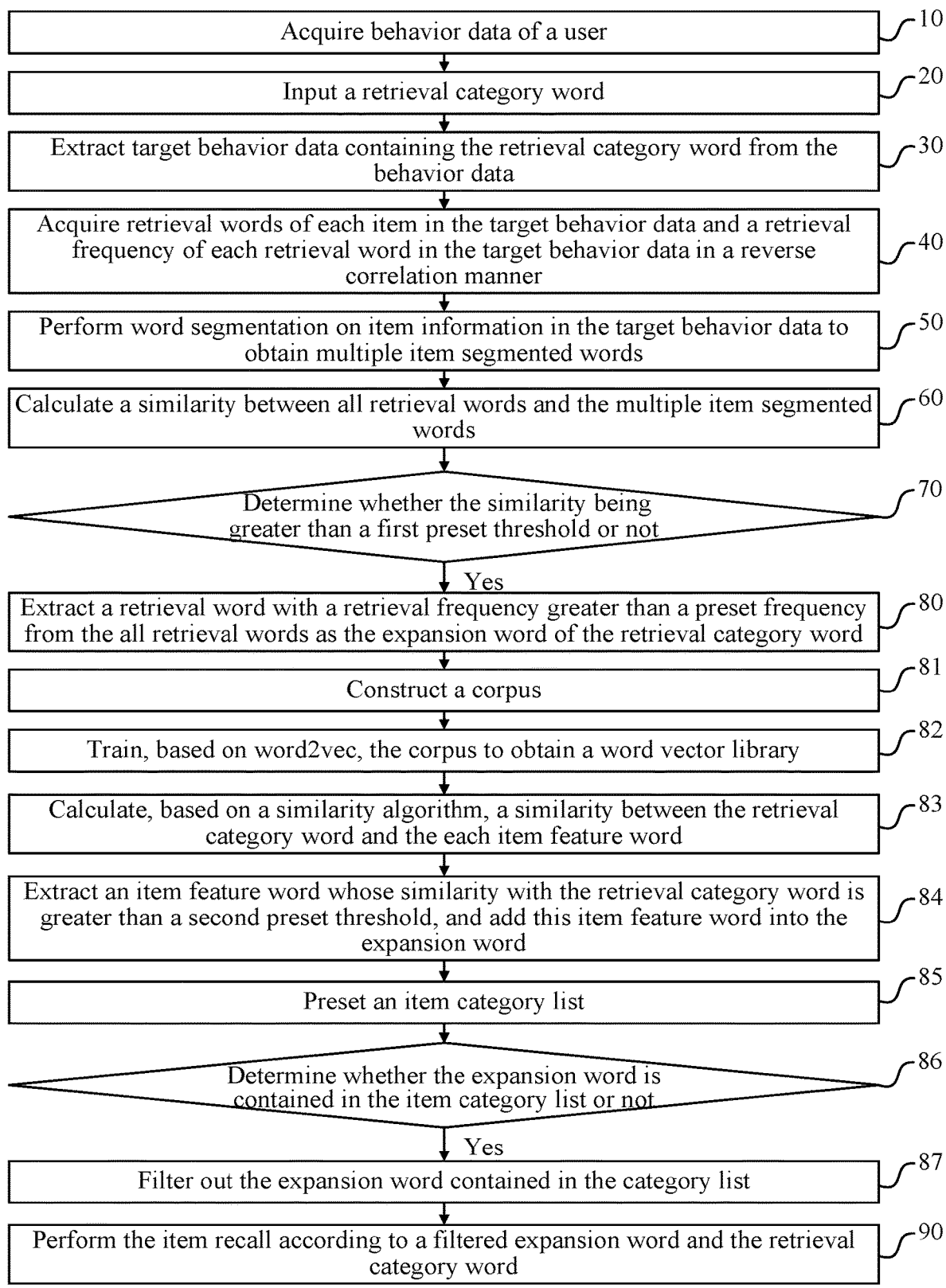
FIG. 3 is a flowchart of an item recall method according to an embodiment 2 of the present disclosure.

The item recall method of this embodiment is further improved on the basis of the embodiment 1, as shown in FIG. 3, before the step 90, the item recall method further includes described below.

In step 81, a corpus is constructed, where the corpus includes an item recommendation article and item basic information.

In step 82, the corpus is trained based on word2vec to obtain a word vector library, where the word vector library stores multiple item feature words and a feature vector corresponding to each item feature word.

In step 83, a similarity between the retrieval category word and the each item feature word is calculated based on a similarity algorithm.

In step 84, an item feature word whose similarity with the retrieval category word is greater than a second preset threshold is extracted, and this item feature word is added into the expansion word.

In this embodiment, in consideration of the expansion of an item category, the expansion word obtained based on the above method may be easily expanded to adjacent categories or superior categories or other existing categories, for example, expansion words of "beef" include "chicken", expansion words of "banana" include "pineapple", expansion words of "computer desk" include "desk". If an item corresponding to an existing category word needs to be recalled, only a corresponding existing category word needs to be selected for item recall, in the present application, these expansion words may be excluded by filtering through an existing category table. As shown in FIG. 3, before the step 90, and the item recall method further includes described below.

In step 85, an item category list is preset, where the item category list includes multiple item categories and attributes of all items under each item category.

In step 86, whether the expansion word being contained in the item category list is determined, and if yes, then a step 87 is performed.

In step 87, the expansion word contained in the category list is filtered out.

Further, the step 90 includes that the item recall is performed according to a filtered expansion word and the retrieval category word.

In this embodiment, item recommendation articles, item names and the like of each platform are used as a corpora to train a word2vec model, a feature word and a corresponding word vector are generated based on a trained model, and several words with a highest similarity are calculated and obtained based on the similarity to serve as an expansion word of the retrieval category word, which is complementary to the expansion of retrieval category word by using a behavior data process described above, therefore the recall coverage rate is further increased.

Embodiment 3

Provided is an electronic device. The electronic device includes a memory, a processor, and a computer program stored on the memory and executable on the processor. The processor, when executing the computer program, implements the item recall method of any one of the embodiments 1 or 2.

Figure 4:
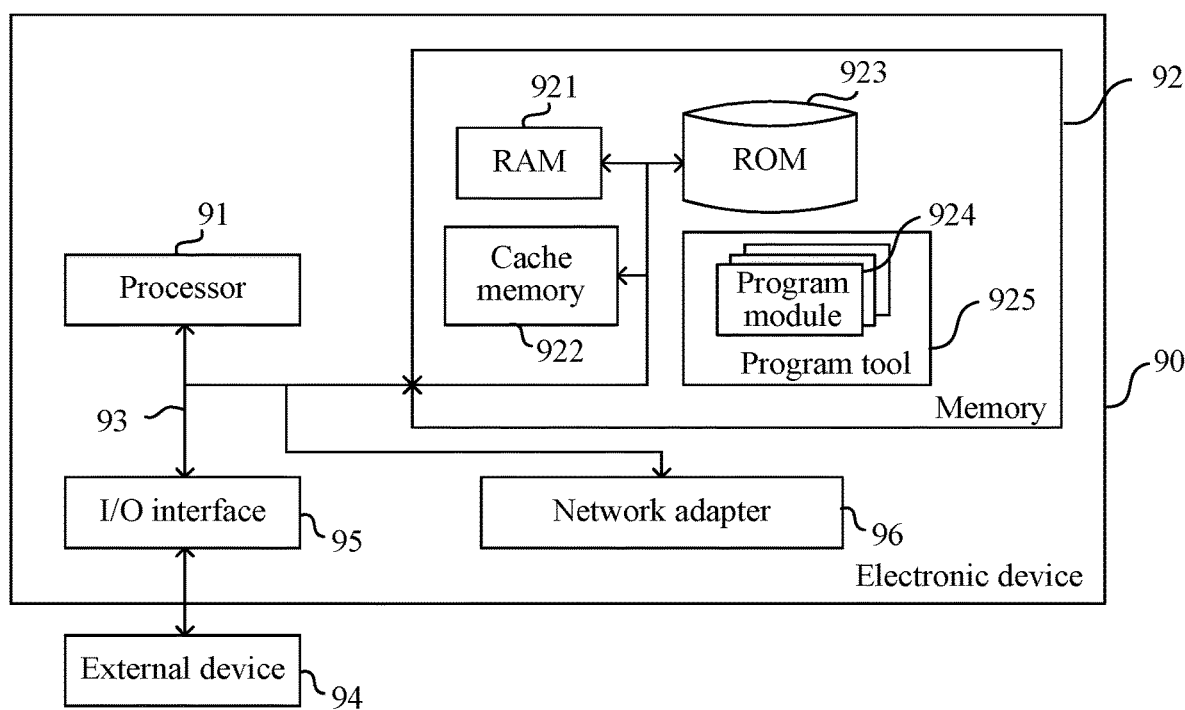
FIG. 4 is a schematic structural diagram of an electronic device according to an embodiment 3 of the present disclosure.

FIG. 4 is a schematic structural diagram of an electronic device provided in this embodiment. FIG. 4 shows a block diagram of an exemplary electronic device 90 suitable for use in implementing the implementations of the present disclosure.

The electronic device 90 shown in FIG. 4 is merely an example of the present disclosure.

As shown in FIG. 4, the electronic device 90 may be embodied in a form of a general purpose calculation device, which may be, for example, a server device.

The assemblies of the electronic device 90 may include at least one processor 91, at least one memory 92, and a bus 93 that connects different system assemblies (including the memory 92 and the processor 91).

The bus 93 includes a data bus, an address bus, and a control bus.

The memory 92 may include a volatile memory, such as a random access memory (RAM) 921 and/or a cache memory 922, and may further include a read only memory (ROM) 923.

The memory 92 may further include a program tool 925 having a set of (at least one) program modules 924, such program modules include, but are not limited to, an operating system, one or more application programs, other program modules, and program data, and each or some combination of these examples may include implementations of a network environment.

The processor 91 executes various functional applications and data processing by running a computer program stored in the memory 92.

The electronic device 90 may also communicate with one or more external devices 94 (e.g., a keyboard, a pointing device, etc.). Such communication may occur via an input/output (I/O) interface 95. Moreover, the electronic device 90 may also communicate with one or more networks (e.g., a local area network (LAN), a wide area network (WAN), and/or a public network such as the Internet) through a network adapter 96. The network adapter 96 communicates with other modules of the electronic device 90 through the bus 93.

It should be appreciated that although not shown in the drawings, other hardware and/or software modules may be used in connection with the electronic device 90, the other hardware and/or software modules include a microcode, a device driver, a redundant processor, an external disk drive array, a RAID (disk array) system, a tape driver, and a data backup storage system, and the like.

It should be noted that although several units/modules or sub-units/modules of the electronic device are mentioned in the above detailed description, this division is merely exemplary and not mandatory. Indeed, features and functionalities of two or more units/modules described above may be embodied in one unit/module according to the implementations of the present application. Conversely, a feature and functionality of one unit/module described above may be further divided into being embodied by multiple units/modules.

Embodiment 4

Provided is a computer readable storage medium. A computer program is stored on the computer readable storage medium. The program, when executed by a processor, implements steps of the item recall method of any one of the embodiments 1 or 2.

In an embodiment, the readable storage medium may include a portable disk, a hard disk, a random access memory, a read only memory, an erasable programmable read only memory, an optical storage device, a magnetic storage device, or any suitable combination thereof.

In a possible implementation, the present disclosure may also be implemented in a form of a program product including a program code. When the program product is run on a terminal device, and the program code is used for enabling the terminal device to perform steps of implementing the item recall method of any one of the embodiments 1 or 2.

The program code for performing the present disclosure may be written in any combination of one or more programming languages, the program code may be executed in following manners: executed entirely on a user device, executed partly on the user device, executed as an independent software package, executed partly on the user device and partly on a remote device, or executed entirely on the remote device.

Embodiment 5

Figure 5:
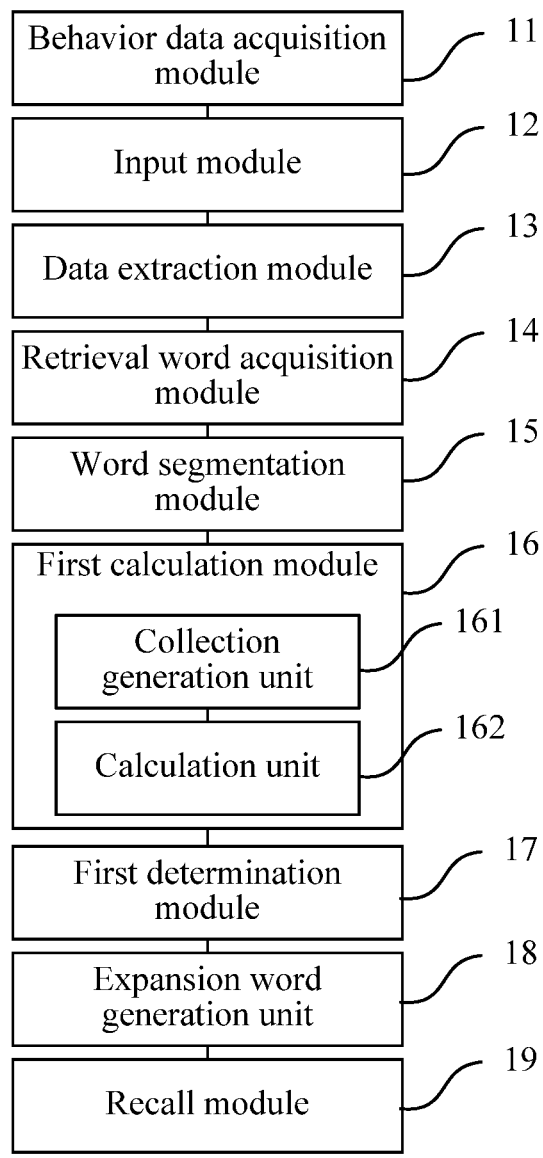
FIG. 5 is a schematic block diagram of an item recall system according to an embodiment 5 of the present disclosure.

Provided is an item recall system, as shown in FIG. 5, the item recall system includes a behavior data acquisition module 11, an input module 12, a data extraction module 13, a retrieval word acquisition module 14, a word segmentation module 15, a first calculation module 16, a first determination module 17, an expansion word generation module 18 and a recall module 19.

The behavior data acquisition module 11 is configured to acquire behavior data of a user, where the behavior data includes items which are clicked and/or purchased and item information of each item.

The input module 12 is configured to input a retrieval category word.

The data extraction module 13 is configured to extract target behavior data containing the retrieval category word from the behavior data.

The retrieval word acquisition module 14 is configured to acquire retrieval words of each item in the target behavior data and a retrieval frequency of each retrieval word in the target behavior data in a reverse correlation manner; specifically, the retrieval word acquisition module 14 is configured to generate a relation list according to the behavior data, where the relation list is used for representing a corresponding relation between the retrieval words and the items which are clicked and/or purchased, and acquire, based on the relation list, the retrieval words of the each item in the target behavior data and the retrieval frequency of the each retrieval word in the target behavior data.

The word segmentation module 15 is configured to perform word segmentation on the item information in the target behavior data to obtain multiple item segmented words.

The first calculation module 16 is configured to calculate a similarity between all retrieval words and the multiple segmented words.

The first calculation module 16 includes a collection generation unit 161 and a calculation unit 162.

The set generation unit 161 is configured to perform a de-duplication on the all retrieval words to generate a retrieval word set, and is further configured to perform the de-duplication on the multiple item segmented words to generate an item segmented word set.

The calculation unit 162 is configured to calculate, based on a Jaccard algorithm, a similarity between the retrieval word set and the item segmented word set.

The first determination module 17 is configured to determine whether the similarity is greater than a first preset threshold or not, and if yes, then call the expansion word generation unit 18.

The expansion word generation module 18 is configured to extract, from the all retrieval words, a retrieval word with a retrieval frequency greater than a preset frequency as an expansion word of the retrieval category word.

The recall module 19 is configured to perform, according to the retrieval category word and the expansion word, item recall.

In this embodiment, when the category word is used for the item recall, an expansion word of an item category word is extracted and obtained by using the acquired behavior data, so that the recall accuracy is ensured, and meanwhile the coverage rate of recalled items is improved.

Embodiment 6

Figure 6:
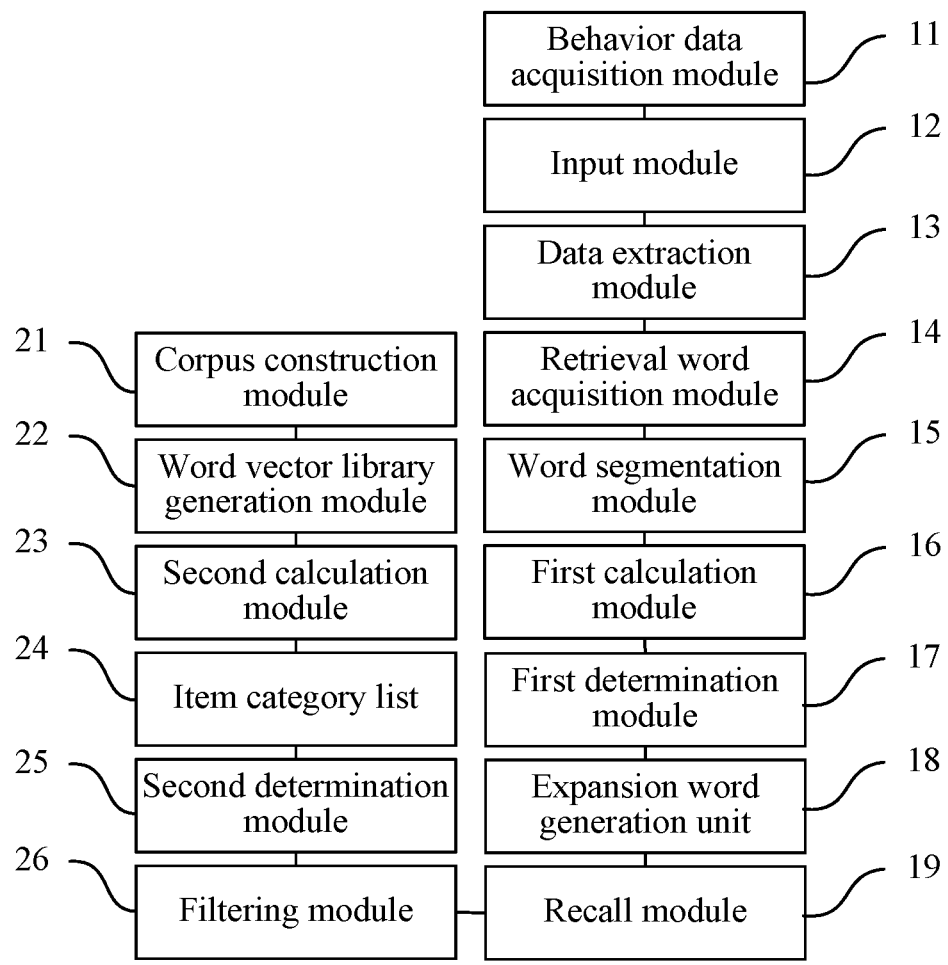
FIG. 6 is a schematic block diagram of an item recall system according to an embodiment 6 of the present disclosure.

The item recall system of this embodiment is further improved on the basis of the embodiment 5, as shown in FIG. 6, the item recall system further includes a corpus construction module 21, a word vector library generation module 22 and a second calculation module 23.

The corpus construction module 21 is configured to construct a corpus, and the corpus includes an item recommendation article and item basic information.

The word vector library generation module 22 is configured to train, based on word2vec, the corpus to obtain a word vector library, where the word vector library stores multiple item feature words and a feature vector corresponding to each item feature word.

The second calculation module 23 is configured to calculate, based on a similarity algorithm, a similarity between the retrieval category word and the each item feature word.

The expansion word generation module 18 is further configured to extract an item feature word whose similarity with the retrieval category word is greater than a second preset threshold, and add this item feature word into the expansion word.

In this embodiment, in consideration of the expansion of an item category, the expansion word obtained based on the above method may be easily expanded to adjacent categories or superior categories or other existing categories, for example, expansion words of "beef" include "chicken", expansion words of "banana" include "pineapple", expansion words of "computer desk" include "desk". If an item corresponding to an existing category word needs to be recalled, only a corresponding existing category word needs to be selected for item recall, in the present application, these expansion words may be excluded by filtering through an existing category table. As shown in FIG. 6, the item recalling system further includes a second determination module 25, a filtering module 26 and an item category list 24, where the item category list 24 includes multiple item categories and attributes of all items under each item category.

The second determination module 25 is configured to determine whether the expansion word is contained in the item category list 24, and if yes, then call the filtering module 26.

The filtering module 26 is configured to filter out the expansion word contained in the category list.

The recall module 19 is configured to perform the item recall according to a filtered expansion word and the retrieval category word.

In this embodiment, item recommendation articles, item names and the like of each platform are used as a corpora to train a word2vec model, a feature word and a corresponding word vector are generated based on a trained model, and several words with a highest similarity are calculated and obtained based on the similarity to serve as an expansion word of the retrieval category word, which is complementary to the expansion of retrieving the category word by using a behavior data process described above, therefore the recall coverage rate is further increased.

In the present disclosure, when the category word is used for the item recall, an expansion word of an item category word is extracted and obtained by using the acquired behavior data, so that the recall accuracy is ensured, and meanwhile the coverage rate of recalled items is improved.

What is claimed is:

1. An item recall method, implemented by an electronic device, where the electronic device comprises a memory, a processor, and a computer program stored on the memory and executable on the processor, wherein the processor is configured to implement the item recall method when executing the computer program,
the item recall method comprises:
acquiring, by the electronic device, behavior data of a user, wherein the behavior data comprises items which are clicked and/or purchased and item information of each of the items;
inputting, by the electronic device, a retrieval category word;
extracting, by the electronic device, target behavior data containing the retrieval category word from the behavior data;
acquiring, by the electronic device, retrieval words of each of the items in the target behavior data and a retrieval frequency of each of the retrieval words in the target behavior data in a reverse correlation manner;
performing, by the electronic device, word segmentation on the item information in the target behavior data to obtain a plurality of item segmented words;
calculating, by the electronic device, a similarity between all of the retrieval words and the plurality of item segmented words;
determining, by the electronic device, whether the similarity is greater than a first preset threshold or not, and based on a result of determination that the similarity is greater than a first preset threshold, extracting, by the electronic device, a retrieval word with a retrieval frequency greater than a preset frequency as an expansion word of the retrieval category word from the all of the retrieval words; and
performing, by the electronic device, item recall according to the retrieval category word and the expansion word;

wherein before performing, by the electronic device, the item recall according to the retrieval category word and the expansion word, the item recall method further comprises:
constructing, by the electronic device, a corpus, wherein the corpus comprises an item recommendation article and item basic information;
training, by the electronic device, the corpus to obtain a word vector library based on word2vec, wherein the word vector library is configured to store a plurality of item feature words and a feature vector corresponding to each of the plurality of item feature words;
calculating, by the electronic device, a similarity between the retrieval category word and the each of the item feature words based on a similarity algorithm; and
extracting, by the electronic device, an item feature word whose similarity with the retrieval category word is greater than a second preset threshold, to be added into the expansion word.

2. The item recall method of claim 1, wherein acquiring, by the electronic device, the retrieval words of the each of the items in the target behavior data and the retrieval frequency of the each of retrieval words in the target behavior data in the reverse correlation manner comprises:
generating, by the electronic device, a relation list according to the behavior data, wherein the relation list is used for representing a corresponding relation between the retrieval words, and the items which are clicked and/or purchased; and
acquiring, by the electronic device, the retrieval words of the each of the items in the target behavior data and the retrieval frequency of the each of the retrieval words in the target behavior data based on the relation list.

3. The item recall method of claim 2, wherein calculating, by the electronic device, the similarity between the all of the retrieval words and the plurality of item segmented words comprises:
performing, by the electronic device, a de-duplication on the all of the retrieval words to generate a retrieval word set;
performing, by the electronic device, a de-duplication on the plurality of item segmented words to generate an item segmented word set; and
calculating, by the electronic device, a similarity between the retrieval word set and the item segmented word set based on a Jaccard algorithm.

4. The item recall method of claim 1, wherein calculating, by the electronic device, the similarity between the all of the retrieval words and the plurality of item segmented words comprises:
performing, by the electronic device, a de-duplication on the all of the retrieval words to generate a retrieval word set;
performing, by the electronic device, a de-duplication on the plurality of item segmented words to generate an item segmented word set; and
calculating, by the electronic device, a similarity between the retrieval word set and the item segmented word set based on a Jaccard algorithm.

5. The item recall method of claim 1, wherein before performing, by the electronic device, the item recall according to the retrieval category word and the expansion word, the item recall method further comprises:
presetting, by the electronic device, an item category list, wherein the item category list comprises a plurality of item categories and attributes of all of items under each of the plurality of item categories; and determining by the electronic device, whether the expansion word is contained in the item category list or not, and based on the determination that the expansion word is contained in the item category list, filtering, by the electronic device, out the expansion word contained in the item category list;

wherein performing, by the electronic device, the item recall according to the retrieval category word and the expansion word comprises:

performing, by the electronic device, the item recall according to a filtered expansion word and the retrieval category word.

6. An electronic device, comprising a memory, a processor, and a computer program stored on the memory and executable on the processor, wherein the processor is configured to implement an item recall method, when executing the computer program, wherein the item recall method comprises:

acquiring, by the electronic device, behavior data of a user, wherein the behavior data comprises items which are clicked and/or purchased and item information of each of the items;

inputting, by the electronic device, a retrieval category word;

extracting, by the electronic device, target behavior data containing the retrieval category word from the behavior data;

acquiring, by the electronic device, retrieval words of each of the items in the target behavior data and a retrieval frequency of each of the retrieval words in the target behavior data in a reverse correlation manner;

performing, by the electronic device, word segmentation on the item information in the target behavior data to obtain a plurality of item segmented words;

calculating, by the electronic device, a similarity between all of the retrieval words and the plurality of item segmented words;

determining, by the electronic device, whether the similarity is greater than a first preset threshold or not, and based on a result of determination that the similarity is greater than a first preset threshold, extracting, by the electronic device, a retrieval word with a retrieval frequency greater than a preset frequency as an expansion word of the retrieval category word from the all of the retrieval words; and performing, by the electronic device, item recall according to the retrieval category word and the expansion word, wherein before performing, by the electronic device, the item recall according to the retrieval category word and the expansion word, the item recall method further comprises:

constructing, by the electronic device, a corpus, wherein the corpus comprises an item recommendation article and item basic information;

training, by the electronic device, the corpus to obtain a word vector library based on word2vec, wherein the word vector library is configured to store a plurality of item feature words and a feature vector corresponding to each of the plurality of item feature words;

calculating, by the electronic device, a similarity between the retrieval category word and the each of the item feature words based on a similarity algorithm; and extracting, by the electronic device, an item feature word whose similarity with the retrieval category word is greater than a second preset threshold, to be added into the expansion word.

7. A non-transitory readable storage medium, wherein a computer program is stored on the readable storage medium, wherein the computer program is configured to implement an item recall method when executed by a processor of an electronic device, wherein the item recall method comprises:

acquiring, by the electronic device, behavior data of a user, wherein the behavior data comprises items which are clicked and/or purchased and item information of each of the items;

inputting, by the electronic device, a retrieval category word;

extracting, by the electronic device, target behavior data containing the retrieval category word from the behavior data;

acquiring, by the electronic device, retrieval words of each of the items in the target behavior data and a retrieval frequency of each of the retrieval words in the target behavior data in a reverse correlation manner;

performing, by the electronic device, word segmentation on the item information in the target behavior data to obtain a plurality of item segmented words;

calculating, by the electronic device, a similarity between all of the retrieval words and the plurality of item segmented words;

determining, by the electronic device, whether the similarity is greater than a first preset threshold or not, and based on a result of determination that the similarity is greater than a first preset threshold, extracting, by the electronic device, a retrieval word with a retrieval frequency greater than a preset frequency as an expansion word of the retrieval category word from the all of the retrieval words; and performing, by the electronic device, item recall according to the retrieval category word and the expansion word, wherein before performing, by the electronic device, the item recall according to the retrieval category word and the expansion word, the item recall method further comprises:

constructing, by the electronic device, a corpus, wherein the corpus comprises an item recommendation article and item basic information;

training, by the electronic device, the corpus to obtain a word vector library based on word2vec, wherein the word vector library is configured to store a plurality of item feature words and a feature vector corresponding to each of the plurality of item feature words;

calculating, by the electronic device, a similarity between the retrieval category word and the each of the item feature words based on a similarity algorithm; and extracting, by the electronic device, an item feature word whose similarity with the retrieval category word is greater than a second preset threshold, to be added into the expansion word.

* * * * *